M. H. COMSTOCK.
TREE PROTECTOR.
APPLICATION FILED MAY 23, 1917.

1,282,677. Patented Oct. 22, 1918.

INVENTOR
MERRILL H COMSTOCK
BY Hazard & Miller
ATT'YS

UNITED STATES PATENT OFFICE.

MERRILL H. COMSTOCK, OF UPLAND, CALIFORNIA.

TREE-PROTECTOR.

1,282,677.   Specification of Letters Patent.   Patented Oct. 22, 1918.

Application filed May 23, 1917. Serial No. 170,571.

*To all whom it may concern:*

Be it known that I, MERRILL H. COMSTOCK, a citizen of the United States, residing at Upland, in the county of San Bernardino and State of California, have invented new and useful Improvements in Tree-Protectors, of which the following is a specification.

My object is to make an individual tree protector which will be simple in construction, easily applied and removed, and sufficiently effective, and my invention consists in the novel features herein shown, described and claimed.

Specifically, my object is to warm a comparatively large tree and protect it from frost by placing a comparatively small protector around the trunk of the tree and supplying heat within the protector so as to warm the trunk of the tree and stimulate the circulation of warm sap to the foliage.

Figure 1:
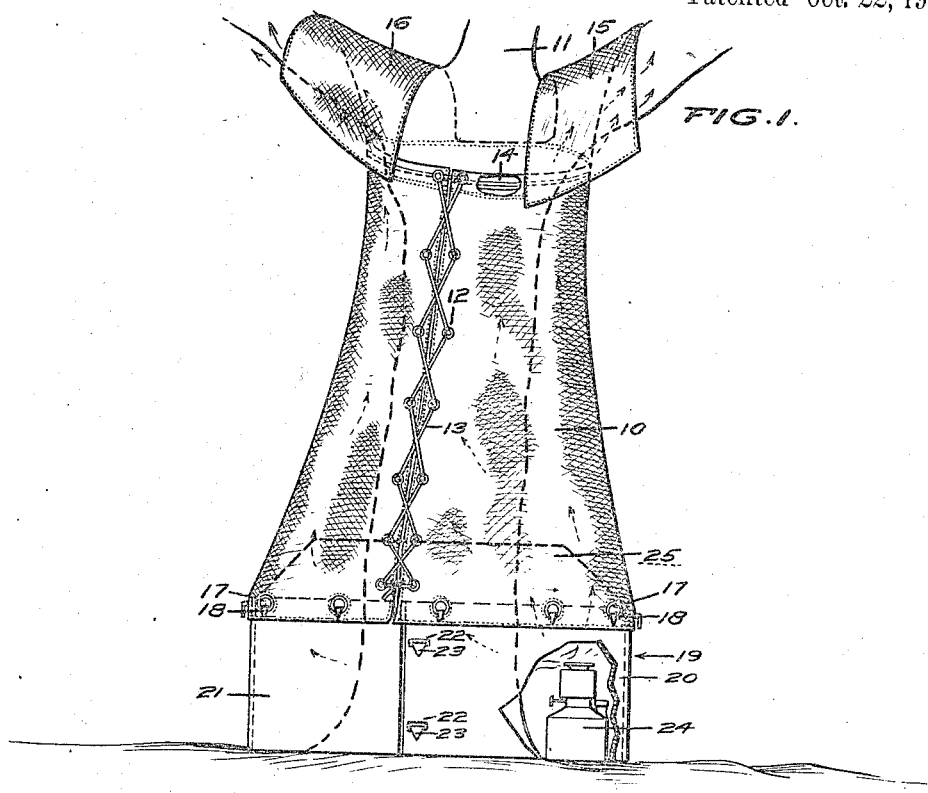
Figure 1 is a view in side elevation illustrating the tree protector as applied to the trunk of a tree by which it is to be heated.
Figure 4:
Fig. 4 is a view in perspective illustrating the baffle ring which is mounted upon the members shown in Fig. 2.
Figure 2:
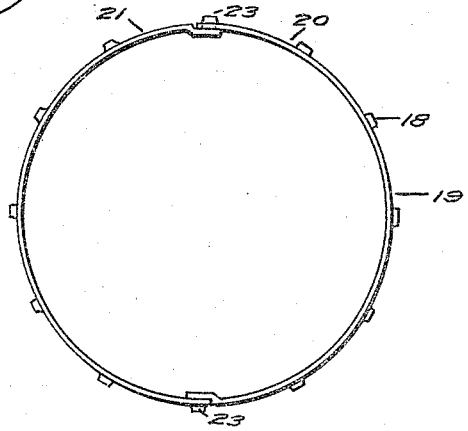
Fig. 2 is a view in plan illustrating the circular reinforcing ring forming the base of the orchard heater and particularly disclosing its composite construction.
Figure 3:
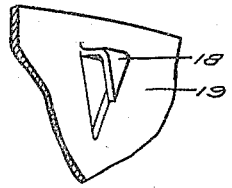
Fig. 3 is an enlarged fragmentary view in perspective illustrating one of the fastening hooks by which the flexible canopy is connected to the upper edge of the annular rigid base portion.

Referring more particularly to the drawings, 10 indicates a canopy which is preferably formed of a substantially water-proof fabric, such as canvas or duck. This fabric is cut to form a frusto-conically shaped inclosure for the trunk of the tree 11. The contiguous edges of the fabric are bound and fitted with a series of eyelets 12, by which the canopy may be laced around the tree. A lacing 13 is provided for this purpose and extends within a hem 14 around the top of the canopy so that the lace will form a puckering string and cause the upper marginal edge of the fabric to be snugly held against the trunk of the tree. A series of flaps, such as indicated by the numerals 15 and 16, are formed around the upper edge of the canopy and may be wrapped around the limbs of the tree at the point of juncture with the trunk. This construction will render the canopy practically air-tight and prevent the escape of heat from the apparatus.

The lower edge of the canopy is formed with a reinforcing hem and also a series of large eyelets 17 occurring at intervals around the canopy and which are engaged by hooks 18 formed integral with the top of a base portion 19. This portion is formed of a pair of semi-flexible plates 20 and 21 which are formed at their opposite ends with perforations 22 engaged by locking tangs 23. In this manner the two plates may be placed end to end and bent around to form a circular base which is of a size to fit within the lower end of the canopy and to permit the eyelets 17 to be engaged by the hooks 18 which are formed along the upper edges of the two plates.

The inclosing structure formed by the base 19 and the canopy 10 is provided to confine the heat produced by a suitable heat generator 24 within an area directly surrounding the trunk of the tree. As here shown the heat generator is a lamp having a suitable burner and a fuel container. It will be understood that other heating elements might be used, such as steam coils, or electric heating coils, without departing from the spirit of the invention. In order that the heat developed by the generator will be confined within the canopy and directed toward the sides of the tree, a frusto-conical baffle plate 25 is provided and adapted to rest upon the upper edges of the plates 20 and 21 forming the base 19, as particularly indicated in dotted lines in Fig. 1.

When a tree is to be protected against frost, the plates 20 and 21 are connected to each other and brought to encircle the trunk of the tree. They will then rest upon the ground and may be slightly embedded therein in order to more thoroughly seal the apparatus. The canopy is then wrapped around the trees, laced along its sides, and the eyelets 17 fastened over the hooks 18. The various limbs of the tree are covered by means of the flaps indicated in Fig. 1 of the drawings and the device is ready for operation. A heating element 24 is then lighted and placed beneath the canopy and rests upon the ground beside the trunk of the tree. This heat generator is normally intended to maintain a temperature within the apparatus ranging from 60 to 80 degrees Fahrenheit. However, a higher temperature than this may be permitted to develop within the structure without damaging the tree. Care must be taken though that the heat generated within the device does not reach a temperature which would injure a tree. After the device has been used it may be taken down, the parts 20 and 21 separated and caused to lie flat and the fabric canopy folded up so that the entire structure may be conveniently packed away and protected from the elements.

The function of a tree protector constructed and operated in accordance with the principles of my invention is to warm the trunk of the tree and stimulate the circulation of warm sap through the trunk of the tree to the foliage.

It may be found desirable to use an electric heating element instead of the lamp here shown. In which case it would no doubt be advantageous to bury the element within the ground, inclosed by the canopy. This will permit the tree to be thoroughly heated along the trunk and also will allow its roots to be warmed by the heat of the surrounding soil. The heat will also travel up the outside of the trunk of the tree along the limbs and drive away the cold, warm the bark, and help to keep the sap warm.

I claim:

An apparatus for heating a tree, comprising a metallic wall adapted to be positioned around the base of a tree, a fabric canopy mounted around the trunk of the tree, means whereby the contiguous edges of said canopy may be fastened together, when in position, means for detachably securing the lower edge of the canopy to the top of the metallic wall, and means whereby the compartment formed by the wall and canopy around the tree may be heated to warm the tree.

In testimony whereof I have signed my name to this specification.

MERRILL H. COMSTOCK.

Copies of this patent may be obtained for five cents each, by addressing the "Commissioner of Patents, Washington, D. C."